P. D. THOMPSON.
CHAIN HOOK.
APPLICATION FILED MAY 11, 1920.

1,353,676.

Patented Sept. 21, 1920.

P. D. Thompson.
INVENTOR

WITNESS:
BY
ATTORNEY

UNITED STATES PATENT OFFICE.

PERRY D. THOMPSON, OF TULSA, OKLAHOMA.

CHAIN-HOOK.

1,353,676. Specification of Letters Patent. Patented Sept. 21, 1920.

Application filed May 11, 1920. Serial No. 380,570.

*To all whom it may concern:*

Be it known that I, PERRY D. THOMPSON, a citizen of the United States, residing at Tulsa, in the county of Tulsa and State of Oklahoma, have invented new and useful Improvements in Chain-Hooks, of which the following is a specification.

This invention relates to a hook for use in connecting the ends of chains together and the principal object of the invention is to provide means for preventing the hook from being detached from the chain if the chain should become slack.

The invention is especially adapted for use on automobile tire chains, though it will of course be understood that I do not wish to be limited in this respect.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1:
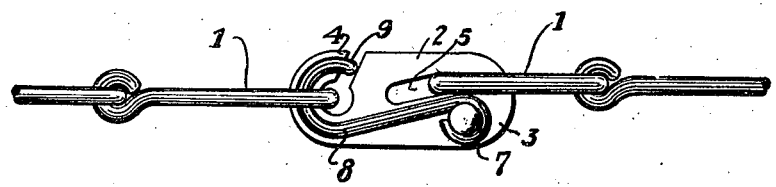
Figure 1 is a view showing the invention used as a connection between the ends of the chain.
Figure 2:
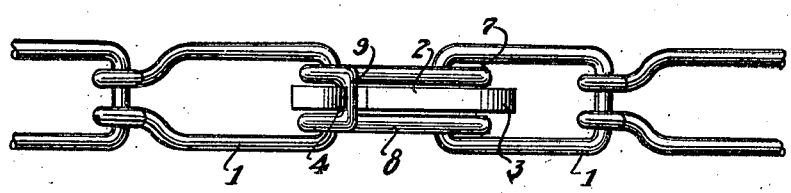
Fig. 2 is an edge view of Fig. 1.
Figure 3:
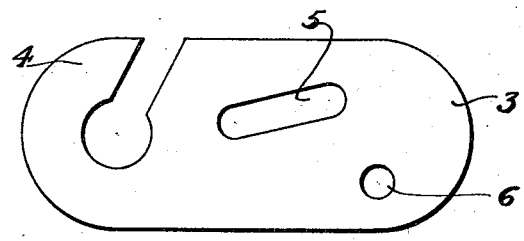
Fig. 3 is a view of the plate.

In these views 1 indicates the end portions of a chain or a pair of chains and 2 indicates my improved hook member, connecting the end links of the chain together. This device consists of a plate 3 recessed at one end to form the hook 4 and having the inclined slot 5 and the hole 6 therein. A rivet 7 passes through said hole and this rivet acts as a pivot for the double wire hook 8, which is formed of a loop of wire having its ends provided with eyes to engage the rivet and its looped end curved to form a hook. The cross piece 9 of the wire hook is adapted to engage the space between the end of the hook 4 and the body of the plate as shown in Fig. 1 so as to fill this space and prevent the passage of the link or other part which is engaging the hook.

In placing the link in engagement with the hook member the wire hook 7 is first raised and the link is passed over this hook and then placed in engagement with the hook 4. As the link passes into engagement with the hook 4 the wire hook 8 will have its cross piece passed between the space between the beak of the hook 4 and the body of the plate. If the chain should become slack the link engaging slot 5 will slide down said slot and rest upon the limbs of the hook 8 thus preventing said hook from moving away from the plate and thus keeping its cross piece closing the opening of the hook 4. Thus the link is held in engagement with hook 4 at all times.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A hook of the class described comprising a plate having a hook therein, a second hook pivotally mounted on the plate and having a portion adapted to close the opening of the hook on the plate and means for slidingly connecting the plate to its carrying member so that said carrying member will hold the hooks in engagement when said member is slack.

2. A hook of the class described comprising a plate having a hook at one end and an inclined slot adjacent its other end, a chain having its end link engaging said slot, a hook member pivotally connected with the plate at a point adjacent the outer end of the slot, said hook member having a part thereof adapted to enter the space between the beak of the hook and the body of the plate, said slot causing the link to hold the hook member in position when the chain is slack.

3. A device of the class described comprising a plate having a hook at one end and an inclined slot adjacent its other end, said slot receiving the link of the carrying chain, a hook formed of a U-shaped piece of wire and having its ends pivotally connected with the plate, one on each side thereof and its cross piece adapted to enter the space between the beak of the hook and the body of the plate, the pivoted ends of the wire hook being located under the slot so that the link will hold the hook in position when the chain is slack.

In testimony whereof I affix my signature.

PERRY D. THOMPSON.